Nov. 25, 1969   H. J. SETZER   3,480,417
HYDROGEN GENERATOR INCLUDING A DESULFURIZER
EMPLOYING A FEEDBACK EJECTOR
Filed Sept. 26, 1967   2 Sheets-Sheet 1

INVENTOR
HERBERT J. SETZER

BY
ATTORNEY

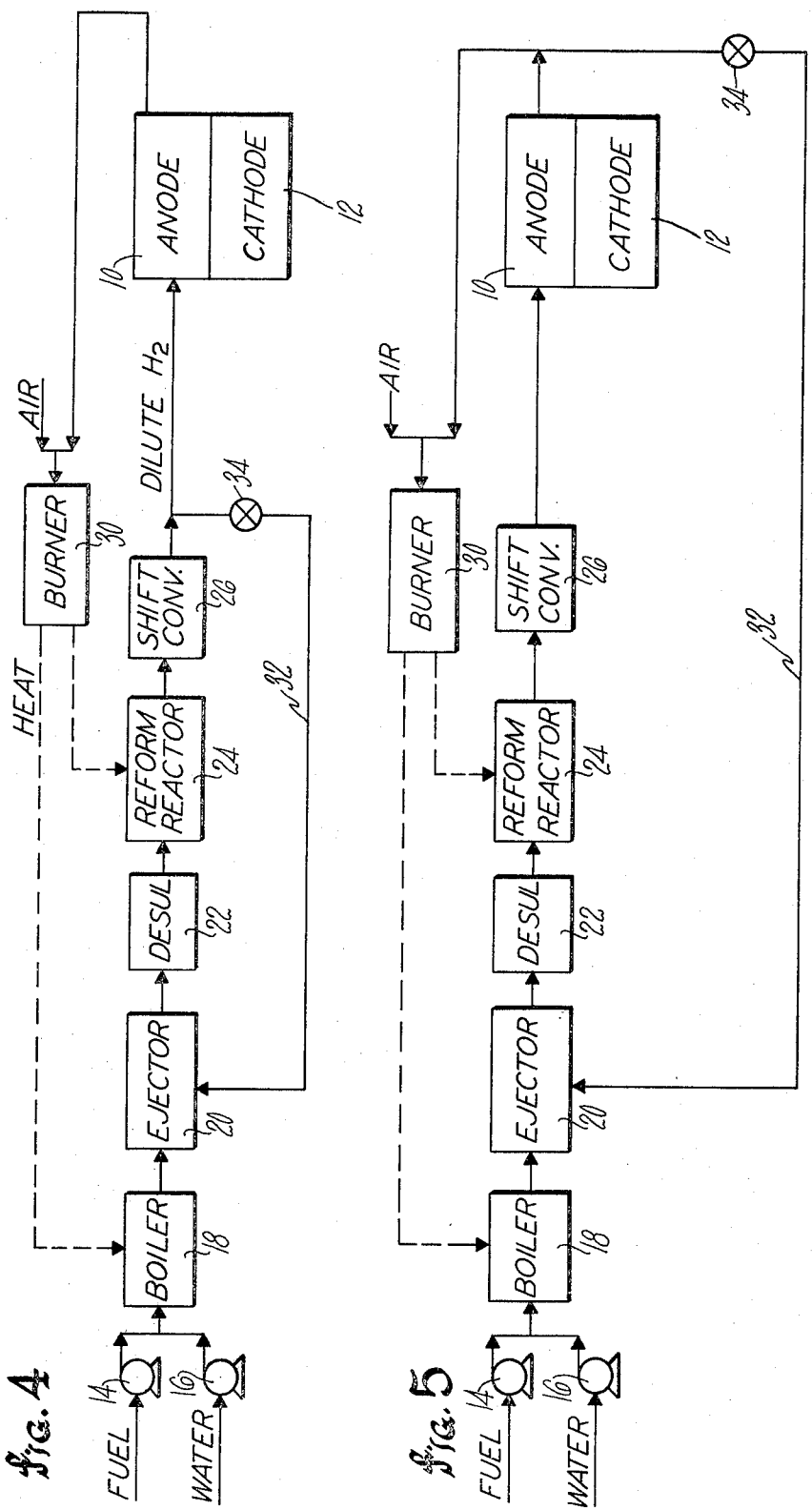

United States Patent Office 3,480,417
Patented Nov. 25, 1969

3,480,417
HYDROGEN GENERATOR INCLUDING A DESULFURIZER EMPLOYING A FEEDBACK EJECTOR
Herbert J. Setzer, Ellington, Conn., assignor to United Aircraft Corporation, East Hartford, Conn., a corporation of Delaware
Filed Sept. 26, 1967, Ser. No. 670,640
Int. Cl. C01l 3/00
U.S. Cl. 48—94                3 Claims

ABSTRACT OF THE DISCLOSURE

A hydrogen generator including a desulfurization device upstream of a steam-reforming reactor. Recycle hydrogen is fed to an ejection device which is utilized as the means to feed at least the steam feedstream to the desulfurization device.

CROSS-REFERENCE TO RELATED APPLICATIONS

Desulfurizing means useful in conjunction with the present invention is disclosed and claimed in a copending application of the same assignee, entitled Sulfur Removal From Hydrocarbons, filed on even date herewith by H. J. Setzer and R. W. Whiting, Ser. No. 670,636.

Details of a hydrocarbon generator of which the present invention may be comprised are disclosed in an application of the same assignee, entitled Method and Apparatus for Generating Hydrogen From Liquid Hydrogen Containing Feedstock, filed Aug. 3, 1965, by R. F. Buswell et al., Ser. No. 476,906.

BACKGROUND OF THE INVENTION

Field of invention

This invention relates to the removal of sulfur from hydrocarbon fuels in a hydrogen generation process, and more particularly to apparatus for utilizing feedback hydrogen for hydrodesulfurization.

Description of the prior art

Fuel cell powerplants are known to include two separate main sections. The fuel cell proper reacts oxygen (or air) with hydrogen so as to form electricity together with waste hydrogen and air byproducts as well as heat and water. The other portion of the fuel cell powerplant system is the hydrogen generator, which is sometimes referred to as a reformer. The hydrogen generator portion of a fuel cell powerplant reacts a combination of hydrocarbon fuel and water to generate hydrogen gas for use in a fuel cell. In the prior art, such systems utilize sulfur-free hydrocarbon fuels. However, the usefulness of fuel cells is mitigated due to the need for special refining of the hydrocarbon fuel so as to achieve a low sulfur content prior to use in a fuel cell powerplant system. In order for the efficiencies of a fuel cell to reach maximum value, many applications of fuel cells would be enhanced by the ability of the fuel cell to use commercially available hydrocarbon fuels such as jet engine fuel, unleaded gasolines, natural gas, etc., as the source of hydrocarbons for hydrogen generation. In order to permit the use of hydrocarbon fuels which have not been specially refined or processed so as to remove the sulfur, the hydrogen generation process may include desulfurization.

SUMMARY OF THE INVENTION

An object of the present invention is the provision of an improved desulfurizing apparatus for use in a hydrogen generator capable of operating with a feedstock having a significant sulfur content.

According to the present invention, the hydrogen content of hydrocarbon fuel being fed to a desulfurizer is increased by feeding hydrogen into the feedstock from a point downstream of a reforming reactor (which generates hydrogen from the feedstock), the feedstock and hydrogen being mixed in an ejector. The hydrogen may be taken directly from the output of the steam reforming reactor or may be taken from either a shift converter or a hydrogen utilization device which are downstream of the reform reactor.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 4 is a schematic block diagram of a hydrogen generator system in accordance with the present invention illustrating a modification of the embodiment of FIG. 2 in which no separator is utilized; and FIG. 5 is a schematic block diagram of a hydrogen generator system illustrating an embodiment in which anode effluent is returned to the feedstock.

DESCRIPTION OF THE PREFERRED EMBODIMENT

Figure 1:
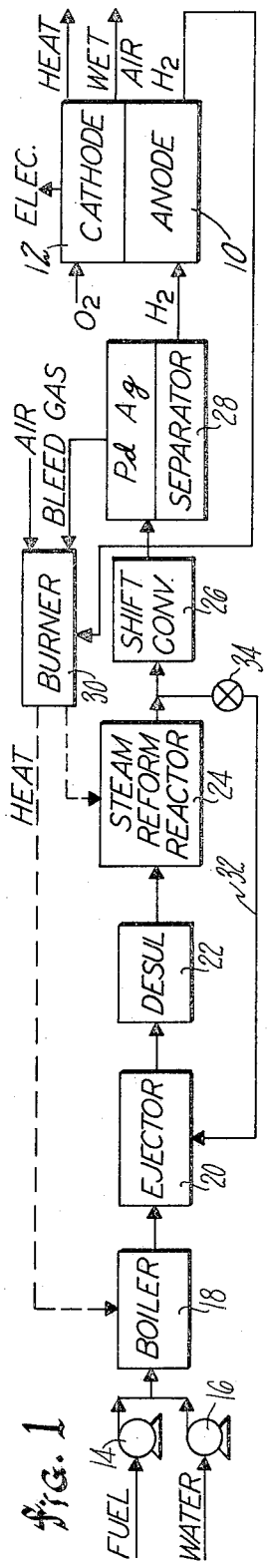
FIG. 1 is a schematic block diagram of a hydrogen generator system in accordance with the present invention illustrating a first embodiment in which hydrogen is fed to the ejector from a point between the reform reactor and the shift converter.

Referring now to FIG. 1, hydrogen is generated to be fed to the anode 10 of a fuel cell 12. Hydrocarbon fuel is fed to a pump 14 where fuel at substantially atmospheric pressure may be pumped up to anywhere from 150 to 300 pounds per square inch absolute (p.s.i.a.), the particular pressure being dependent upon details of the system not involved herewith. Another pump 16 is utilized to similarly pressurize water for admixture with the hydrocarbon fuel at the input to a boiler 18. The output of the boiler is a superheated vapor which comprises a homogeneous mixture of steam and vapors of the hydrocarbons in the fuel. This homogeneous mixture is fed to an ejector 20, the output of which is passed through a desulfurizer 22. The desulfurizer may comprise a combination catalyst and absorbant of any suitable type, but most preferably would be of the type described in a copending application of the same assignee entitled Sulfur Removal From Hydrocarbons filed on even date herewith by H. J. Setzer and R. W. Whiting, Ser. No. 670,636. From the desulfurizer 22, the stock is fed to a steam reforming reactor 24, which is sometimes referred to as a dehydrogenation reactor. The output of the steam reforming reactor 24 is fed to a shift converter 26 which in turn feeds a selective hydrogen diffusion membrane, such as a palladium-silver separator 28. The palladium-silver separator 28 provides nearly pure hydrogen to the anode 10 of the fuel cell 12, and also provides a bleed gas (comprising a mixture of hydrogen, carbon monoxide, carbon dioxide, methane and water) to a burner 30 which combines the bleed gas with air so as to generate heat, the heat being applied to operate the steam reforming reactor 24 and the boiler 18. The boiler 18, the steam reforming reactor 24, the shift converter 26, the palladium-silver separator 28, and the burner 30 may all be of the type described in a copending application of the same assignee entitled "Method and Apparatus for Generating Hydrogen From Liquid Hydrogen Containing Feedstocks," filed on Aug. 3, 1965 by Richard F. Buswell et al., Ser. No. 476,906. Briefly described, the process in the steam-reforming reactor 24 involves converting any of a number of different types of hydrocarbons which are in the feedstock by combining with steam so as to form hydrogen, carbon dioxide, carbon monoxide, and methane, along with some uncombined steam and traces of unconverted hydrocarbons of various types. Then the shift converter 26 in turn combines a high percentage of the carbon monoxide in the output of the steam-reforming reactor 24 with unreacted steam so as to form further hydrogen and carbon dioxide. Thus, the output of this shift converter includes a mixture of nearly all of the hydrogen which was available in the feedstock, some steam, together with carbon monoxide, carbon dioxide and methane. There are also traces of various hydrocarbons which have not been recombined. Thus, hydrogen is converted not only from the hydrocarbon fuel, but also from the water which is combined therewith to form the feedstock. This is described in great detail in the aforementioned copending Buswell et al. application.

As is well known, the presence of hydrogen in a hydrocarbon feedstock has a beneficial effect on the desulfurization reaction.

According to the present invention, a feedback line 32 may include a valve 34 for adjusting flow rates, and permits feeding generated hydrogen to the ejector 20 so that hydrogen will be inserted into the feedstock. In accordance with the embodiment of the invention shown in FIG. 1, the valve 34 is connected to the output of the steam reforming reactor 24, so as to provide molecular hydrogen ($H_2$) into the feedstock at the input to the desulfurizer 22. Of course, other components such as steam, carbon monoxide, carbon dioxide, and methane are also fed into the ejector 20, and thus through the desulfurizer 22. This results in various side reactions, but these are not important to the overall process involved and of no real consequence to the practice of the present invention.

Figure 2:
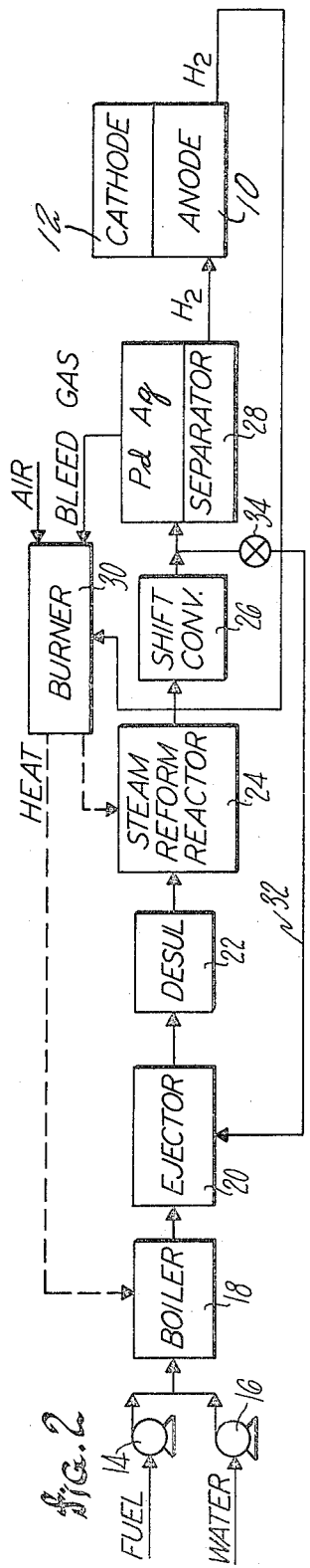
FIG. 2 is a schematic block diagram of an alternative embodiment of the present invention in which hydrogen fed back to the ejector is taken from the output of the shift converter.

Referring now to FIG. 2, a second embodiment of the invention utilizes the output of the shift converter 26 rather than the output of the steam reform reactor 24 for supplying hydrogen through the ejector 20 to the desulfurizer 22. In this case, a greater hydrogen content is available so that a lesser amount of product need be diverted through the feedback line 32. The choice of which embodiment (that of FIG. 1 or FIG. 2) is to be utilized depends upon the particular overall hydrogen generization system being designed, and may be determined to suit the operating parameters of any such a system.

Figure 3:
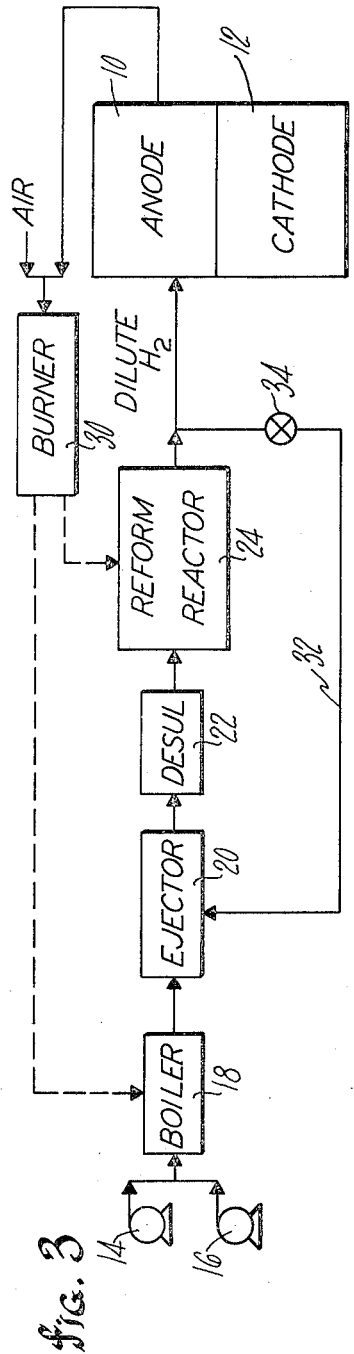
FIG. 3 is a schematic block diagram of a hydrogen generator system illustrating a modification of the embodiment of FIG. 1 in which no separator is utilized.

The embodiment disclosed in FIG. 3 illustrates that the shift converter 26 and palladium-sliver separator 28 of FIGS. 1 and 2 may be eliminated if desired, without altering the present invention. In other words, the invention relates to desulfurization in a hydrogen generator; the enhanced hydrogen generation which is achieved with a shift converter 26, as well as separation of the majority of the hydrogen from the remaining products with the palladium-silver separator 28, need not be utilized if not desired.

The embodiment shown in FIG. 4 illustrates the fact that the silver-palladium separator 28 (FIGS. 1 and 2) may be eliminated without altering the present invention in either of its embodiments, the hydrogen output of the shift converter 26 being available for feedback through the ejector 20 into the feedstock at the input of the desulfurizer 22 whether or not the seperator 28 is used.

In the embodiments of FIGS. 3 and 4, since no palladium-silver separator is used, the pumps 14, 16 may be run at a lower pressure or eliminated altogether. However, desulfurization in a catalyst absorber works better at pressures up to 300 p.s.i.a., so the pumps may be used if desired. In any event, this is a matter of detail design of a particular system, and not significant with respect to the present invention.

In FIG. 5 is illustrated another aspect of the present invention. That is, the effluent from the anode 10 of the fuel cell 12 may be fed back through the line 32 and valve 34 to the ejector 20 so as to supply hydrogen to assist in hydrodesulfurization. This is most readily achieved as illustrated in FIG. 5 by eliminating the use of the palladium-silver separator 28 (see FIGS. 1 and 2) so that there is a low pressure drop through the system. Thus, the pressure at the outlet of the anode 10 will not be too low with respect to the pressure at the output of the boiler 18 so that the ejector 20 will properly function to draw hydrogen into the feedstock at the input to the desulfurizer 22. As illustrated in FIG. 5, the portion of the effluent of the anode 10 which is not fed back to the ejector may be burned in the burner 30 so as to supply heat for the steam reforming reactor 24 and the boiler 18. However, the providing of fuel to the burner 30 is not germane to the present invention, and other arrangements may be selected from among those known to the art for disposing of anode effluent and for providing fuel to the burner 30.

It should be understood that the basic premise of one aspect of the present invention is to utilize an ejector to return hydrogen generated in a hydrogen generator to enrich the feedstock which is fed through the hydrogen generator, the hydrogen being taken from a point in the system at essentially the same pressure as the input to the desulfurizer, thereby to avoid compression of gaseous hydrogen.

Although liquid fuel is considered herein, gaseous fuel could also be used. The hydrogen would then most advantageously be mixed with steam prior to the admixing of steam and gaseous fuel to form the feedstock.

Although the embodiments herein illustrate use of hydrogen in the anode of a fuel cell, it should be understood by those skilled in the art that the principle of the present invention, which relates to diffusion of feedback hydrogen for desulfurization of hydrocarbon feedstock is equally valuable without regard to the use to which the generated hydrogen is to be put.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which I claim as new and desire to secure by Letters Patent of the United States is:

1. A hydrogen generator of the type which generates hydrogen through the reaction of steam and hydrocarbon fuels, comprising:
   a steam reforming reactor;
   desulfurizing means connected with said steam reforming reactor so that the output of said desulfurizing means is applied as the input to said steam reforming reactor;
   an ejector for receiving at least the steam portion of the feedstock, the output of said ejector being fed to said desulfurizer, said desulfurizer receiving hydrocarbon fuel in gaseous form as well as steam; and
   a feedback line connected at a point in said system downstream of said steam reforming reactor for passing products including molecular hydrogen to a second input of said ejector, whereby at least molecular hydrogen is intermixed with at least the stream portion of the feedstock of said hydrogen generator.

2. The hydrogen generator according to claim 1 wherein said feedback line is connected at the output of said stream reforming reactor.

3. The hydrogen generator according to claim 1 including a shift converter, the input of which is connected to the output of said steam reforming reactor, and wherein said feedback line is connected to the output of said shift converter.

References Cited

UNITED STATES PATENTS

| | | | |
|---|---|---|---|
| 2,773,561 | 12/1956 | Hunter | 23—210 XR |
| 2,902,440 | 9/1959 | Beuther et al. | |
| 3,019,096 | 1/1962 | Milbourne | 48—213 |
| 3,148,031 | 9/1964 | Vahldieck et al. | 23—210 |
| 3,178,272 | 4/1965 | Dent et al. | 48—213 |
| 3,278,268 | 10/1966 | Pfefferle | 23—212 |
| 3,350,176 | 10/1967 | Green et al. | 48—214 XR |

FOREIGN PATENTS 992,161  5/1965  Great Britain.

MORRIS O. WOLK, Primary Examiner

BARRY S. RICHMAN, Assistant Examiner

U.S. Cl. X.R.

23—210, 212; 48—214; 208—209